United States Patent
Terai et al.

(10) Patent No.: US 8,244,396 B2
(45) Date of Patent: Aug. 14, 2012

(54) TURNING MACHINE AND MACHINING METHOD BY THE SAME

(75) Inventors: Hiroshi Terai, Niigata (JP); Takao Tatemi, Niigata (JP); Hidenori Sato, Niigata (JP); Hiroaki Kazama, Niigata (JP)

(73) Assignee: Tsugami Corporation, Nihonbashihoridome-cho, Chou-ku, Tokyo (JP)

( * ) Notice: Subject to any disclaimer, the term of this patent is extended or adjusted under 35 U.S.C. 154(b) by 478 days.

(21) Appl. No.: 12/447,246

(22) PCT Filed: Sep. 13, 2007

(86) PCT No.: PCT/JP2007/067857
§ 371 (c)(1),
(2), (4) Date: Apr. 24, 2009

(87) PCT Pub. No.: WO2008/050551
PCT Pub. Date: May 2, 2008

(65) Prior Publication Data
US 2009/0271027 A1    Oct. 29, 2009

(30) Foreign Application Priority Data
Oct. 26, 2006 (JP) .................. 2006-291052

(51) Int. Cl.
*B23B 25/06* (2006.01)
*G06F 19/00* (2011.01)
*B23Q 17/22* (2006.01)

(52) U.S. Cl. .............. 700/192; 82/151; 82/129; 82/124; 82/149; 82/1.11; 82/164; 82/150; 82/137; 82/118; 700/160; 700/186; 700/159; 408/158

(58) Field of Classification Search .................. 700/192; 82/151, 164, 150, 137, 154
See application file for complete search history.

(56) References Cited

U.S. PATENT DOCUMENTS

| 3,731,563 | A | * | 5/1973 | Williams et al. ............... 82/11.5 |
| 4,471,443 | A | * | 9/1984 | Kinoshita et al. ............. 700/193 |
| 4,562,392 | A | * | 12/1985 | Davis et al. .................... 318/572 |
| 4,776,247 | A | * | 10/1988 | Kiya ............................... 82/118 |
| 5,361,472 | A | * | 11/1994 | Kubota ......................... 29/37 A |
| 5,836,727 | A | * | 11/1998 | Scheer .......................... 408/158 |
| 6,815,917 | B2 | * | 11/2004 | Fujinawa ...................... 318/560 |
| 7,225,048 | B2 | * | 5/2007 | Li .................................. 700/121 |
| 2005/0076757 | A1 | * | 4/2005 | Kikuchi et al. ................ 82/129 |
| 2008/0022818 | A1 | * | 1/2008 | Hackh et al. .................... 82/147 |

(Continued)

FOREIGN PATENT DOCUMENTS
JP          54-102672          8/1979
(Continued)

*Primary Examiner* — John R. Cottingham
*Assistant Examiner* — Olvin Lopez Alvarez
(74) *Attorney, Agent, or Firm* — Kilpatrick Townsend & Stockton LLP

(57) ABSTRACT

The turning machine according to the present invention includes a displacement sensor (200) which measures a distance between an immobile reference point and a position of variable point which reflects the positional displacement of the tool, the immobile reference point being able to determine a relative positional correlation relating to a variable position of tools with the progress of machining of the workpiece (W) by the tool (421). In drawings the reference point is set up in the guide bush (90). And based on the measured result by the displacement sensor, the tool is moved so that the center height of the tool and the center line of the workpiece satisfy relatively the predetermined positional correlation. Accordingly, the center height deviation amount due to heat deformation and the like is corrected.

7 Claims, 6 Drawing Sheets

U.S. PATENT DOCUMENTS

2008/0228313 A1 * 9/2008 Hyatt et al. .................. 700/160
2010/0154605 A1 * 6/2010 Kase et al. .................... 82/1.11

FOREIGN PATENT DOCUMENTS

| JP | 59-57142 | * | 4/1984 |
| JP | 62-074507 | | 4/1987 |
| JP | 01-216751 | | 8/1989 |
| JP | 05-023952 | * | 2/1993 |
| JP | 05-31651 | * | 2/1993 |
| JP | 05-185304 | | 7/1993 |
| JP | 06-226593 | * | 8/1994 |
| JP | 2000-033502 | | 2/2000 |
| WO | WO 01/94061 A1 | | 12/2001 |

* cited by examiner

TURNING MACHINE AND MACHINING METHOD BY THE SAME

TECHNICAL FIELD

The present invention relates to a turning machine (lathe) capable of machining a workpiece accurately and machining method by the same.

BACKGROUND ART

In turning machining process, it is necessary to control precisely the position of a tool with respect to a workpiece for machining accurately a workpiece. Especially it is important to set up the center height of tool (a height of the cutting edge of a tool with respect to the workpiece center) accurately. Nevertheless, even though the center height of the tool is set up accurately before machining start, the center height of the tool tends to be off the desired position as machining progresses.

A technique which is focused on the center height alignment, for example, a technique which is disclosed in Patent Literature 1 in the following is well-known.

Patent Literature 1: Unexamined Japanese Patent Application KOKAI Publication No. 2000-33502

DISCLOSURE OF INVENTION

Problems to be Solved by the Invention

Patent Literature 1 discloses a technique which has a vertical positioning device, comprising positioning a vertical relative position between a cutting tool and a main spindle unit which holds and rotates a workpiece, and maintaining the relative position thus performed.

However, the technique in the Patent Literature 1 does not take the error which may occur as machining progresses into consideration at all.

As for the technique corresponding to displacement of center height of tool during machining process, (1) a technique of providing a ball screw with pretension in prospect of temperature increase, (2) a technique of removing a heat displacement effect based on oil temperature control using temperature adjusting mechanism such as an oil temperature controller, (3) a technique of removing the heat displacement effect due to temperature increase by installation of a scale, and the like have been suggested so far.

Among the above-mentioned techniques, regarding (1) and (2), it is possible to decrease absolute amount of center height displacement. However, it is apt to be affected by a tendency or the like each machine has and fluctuations of room temperature or the like. Especially in the case where a workpiece is extraordinarily small, a trouble that is not to be ignored may happen.

Furthermore, the technique (3) has a problem of bringing about cost increase. In addition, since it is inevitable that a small displacement is created due to positional displacement of a detecting plane, a trouble that is not to be ignored may happen when micro-machining is performed.

The present invention was carried out in view of the above circumstances and it is an object of the invention to provide a turning machine and machining method by use of the same through which accurate and precise machining can be performed.

It is further object of the present invention to provide a turning machine and machining method by the same, which can perform suitably setting up of the positional correlation between the tool and the workpiece in a flow of machining process.

It is yet another object of the present invention to provide a turning machine through which accurate machining for a workpiece can be performed and machining method by the same, even when the workpiece having small diameter is to be machined.

Means for Solving the Problem

In order to achieve the above-described objects, a turning machine according to the present invention includes, a main spindle equipped with a chuck for grasping a workpiece; a tool-holding unit on which tools are mounted for machining the workpiece; a measuring device which measures a distance between an immobile reference point and a position of the tool or a predetermined variable point which varies reflecting a displacement of the tool, the immobile reference point being able to determine a relative positional correlation relating to variable positions of tools with the progress of machining of the workpiece by the tool; and a tool holding unit-driving device which moves the tool-holding unit together with tools based on measurement result using the measuring device so that center height of the tool and a center line of the workpiece satisfies predetermined position correlation.

The turning machine according to the present invention may be arranged so that the measuring device is fixed to the tool-holding unit, the predetermined variable point is set up in the measuring device, and the measuring device measures the distance between the measuring unit itself and the reference point.

Moreover the turning machine according to the present invention may be arranged so that the turning machine further includes a guide bush and the reference point is set on the guide bush.

Also the turning machine according to the present invention may be arranged so that the measuring device measures the distance every time machining of a predetermined number of workpieces is completed, and the tool holding unit-driving device moves the tool every time it measures the distance.

Also the turning machine according to the present invention may be arranged so that the tool holding unit-driving device moves the tool in a way that the center height of the tool and the center line of the workpiece are positioned on an identical plane.

Also the turning machine according to the present invention may be arranged so as to further include an air blower for blowing away foreign matter stuck on the measuring device therefrom.

In order to achieve the above-mentioned objects, the machining method by the tuning machine according to the present invention is characterized in measuring the distance between the immobile reference point and the position of the tool which is fixed to the tool-holding unit that moves with the progress of the machining of a workpiece or the predetermined variable point that moves in accordance with movement of the tool, and moving the tool based on the measured distance so that the center height of the tool and the center line of the workpiece satisfy the predetermined positional correlation.

Further, the machining method by the turning machine according to the present invention may be arranged so that the measuring device is fixed to the tool-holding unit, the predetermined variable point is set up in the measuring device, and the measuring device measures the distance between the measuring device itself and the reference point.

Still further, the machining method by the turning machine according to the present invention may be arranged so that the reference point is set up in the guide bush which supports the workpiece.

Still further, the machining method by the turning machine according to the present invention may be arranged so that the measuring device measures the distance every time machining of a predetermined number of workpieces is completed, and the tool-holding unit driving device moves the tool every time it measures the distance.

Effect of the Invention

As described so far, according to the present invention, a distance that can determine a relative positional correlation between the tool position which varies with the progress of machining and an immobile reference point is measured, and based on the measurement result, as height alignment operation between the tool center height and the center line of a workpiece is implemented, accurate and precise machining can be performed.

In particular, as the height adjustment operation can be performed even during machining, a misalignment which occurred during machining can be coped with.

In addition, according to the present invention, when machining of small-diameter workpiece is performed, accurate machining of such workpiece is possible, and in the present invention, more remarkable effects can be realized in such cases, because generally smaller-diameter workpieces require a small amount of machining, and consequently tiny misalignment in center height gives tremendous effects on accuracy and preciseness of machining, but according to the present invention, height alignment operation is appropriately carried out and the center height of the tool is adequately set up.

Figure 1:
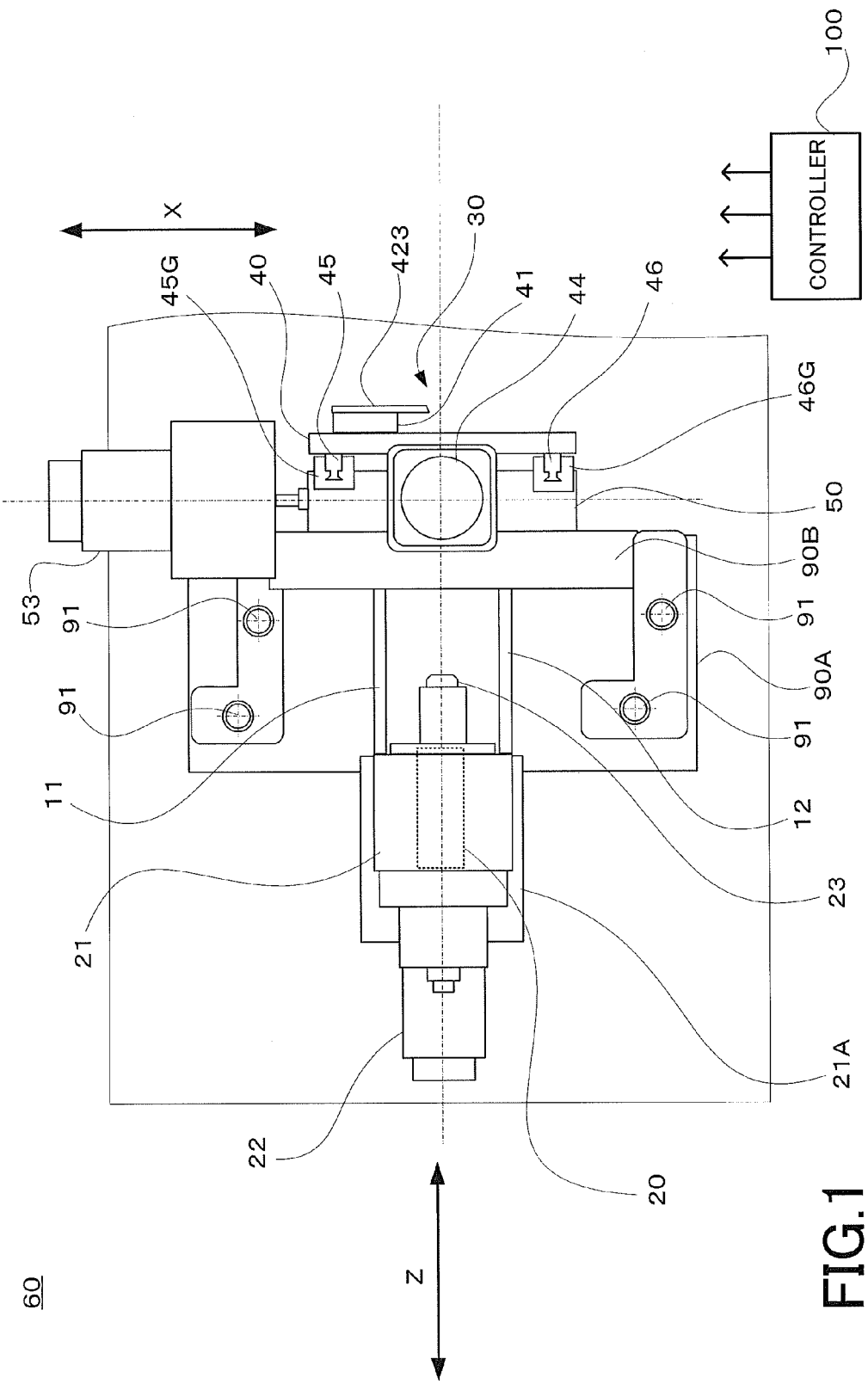
FIG. 1 is a plain view of a turning machine according to an embodiment of the present invention.

EXPLANATION OF REFERENCE NUMERALS 10 bed
20 main spindle
23 chuck
30 tool-holding mechanism
40 Y-axis direction slide
41 tool-holding portion
421, 422, 423 tool
43 ball screw
44 Y-axis motor
50 X-axis direction slide
53 X-axis motor
60 turning machine
90 guide bush
90A the first guide bush-supporting unit
90B the second guide bush-supporting unit
100 controller
200 displacement sensor
201 air blower
W workpiece

BEST MODE FOR CARRYING OUT THE INVENTION

Hereinafter a turning machine (lathe; lathe turning machine) according to an embodiment of the present invention will be described referring to FIG. 1 to FIG. 3. The turning machine 60 includes a bed 10, a main spindle 20, a tool-holding mechanism 30, a guide bush 90, a controller 100, and a displacement sensor 200.

The main spindle 20 is supported by a main spindle frame 21. The main spindle frame 21 is provided on a slide (slider) 21A. The slide 21A is mounted on two rails 11 and 12 which are installed on a bed 10 along Z-axis or left and right direction in FIG. 1. The slide 21A is connected to a Z-axis motor 22. The main spindle 20 or the main spindle frame 21 is driven in the direction of Z-axis along the rails 11 and 12 receiving the power from the Z-axis motor 22.

A motor to rotate the workpiece (not shown) is built in the main spindle frame 21. The motor to rotate the workpiece is to rotate the workpiece grasped by a chuck 23 provided on the main spindle 20 (not shown in FIGS. 1 to 3).

Figure 2:
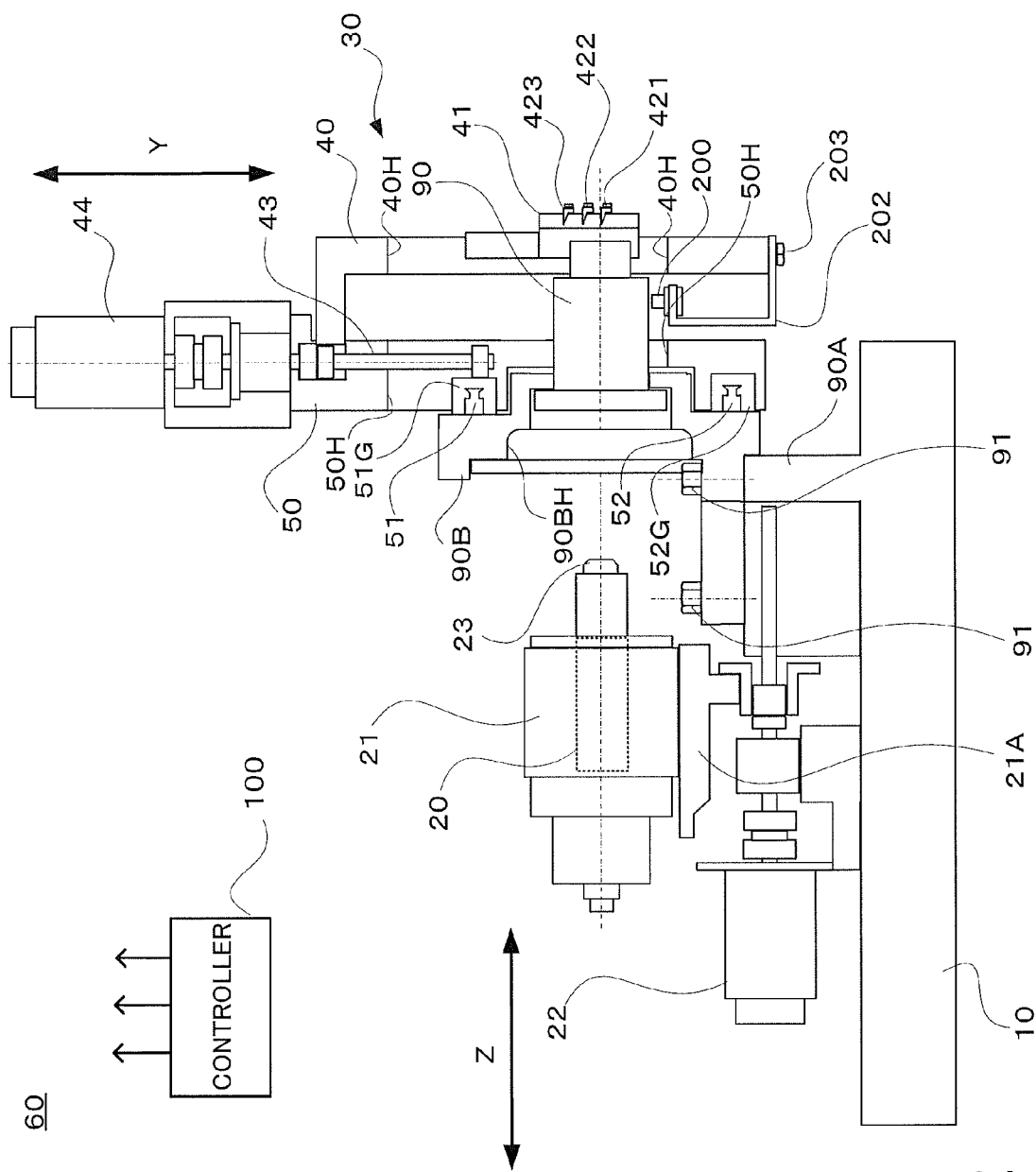
FIG. 2 is a side view of the turning machine shown in FIG. 1.

A tool holding mechanism 30, as shown in FIGS. 1 and 2, is provided with a Y-axis direction slide (slider) 40 and a X-axis direction slide (slider) 50.

The Y-axis direction slide 40, as shown in FIG. 2, has a side view of substantially L-like shape. A plate-like portion which has the wider area of plate-like portions forming the L-like shape, as shown in FIGS. 2 and 3, is formed to have vacant area 40H where the workpiece grasped by the main spindle 20 can pass through. On one surface of the plate-like portion, a tool-holding portion 41 is provided. The tool-holding portion 41 holds a plurality of tools 421, 422, and 423 in a fixed manner. On the other surface of the plate-like portion, as shown in FIG. 1, guides 45 and 46 are provided. The guides 45 and 46 are perpendicular to the Z-axis direction and extend in the Y-axis direction which is a direction of passing through the sheet surface of FIG. 1. The guides 45 and 46 are engaged in guide slots 45G and 46G provided in the X-axis direction slide 50.

The Y-axis direction slide 40, as shown in FIG. 2, the end portion thereof is connected with a ball screw 43 which is disposed along the Y-axis direction. One end portion of this ball screw 43 is connected with a Y-axis motor 44 which can rotate the ball screw 43.

Owing to the arrangement described above, the Y-axis direction slide 40 is driven in the Y-axis direction along the guides 45, 46 receiving power from the Y-axis motor 44.

The X-axis direction slide (slider) 50 has substantially a plate-like shape. The ball screw 43, as shown in FIG. 2, is accommodated in this X-axis direction slide 50. The guide slots 45G and 46G, as shown in FIG. 1, are provided on one surface of the substantially plate-like shape. On the other surface of the substantially plate-like shape, as shown in FIG. 2, guides 51 and 52 are provided.

These guides 51 and 52 are along the X-axis direction which is perpendicular to both of the Z-axis direction and Y-axis direction. The guides 51 and 52 are engaged with a guide bush supporting unit 90B which will be described later.

Figure 3:
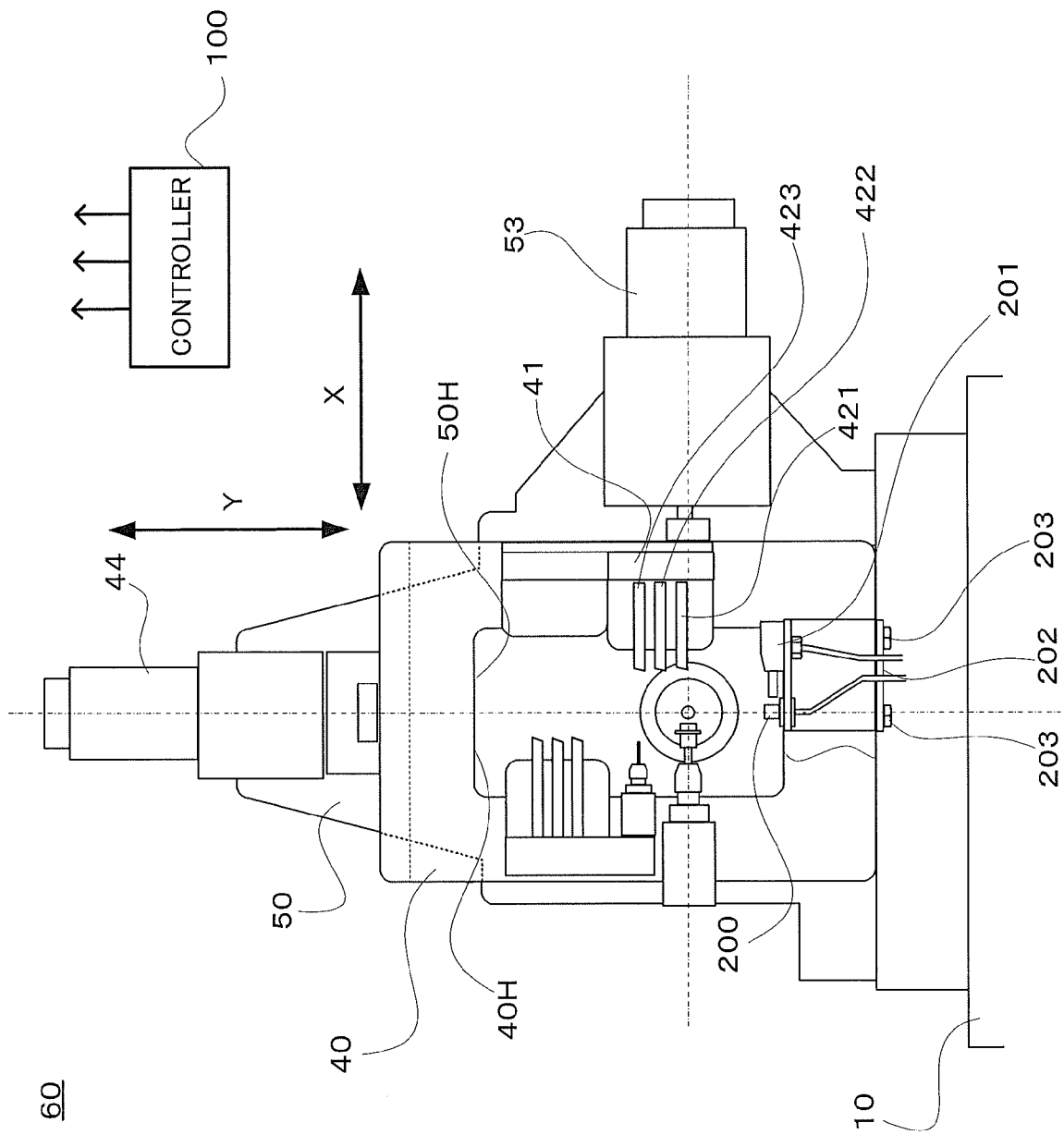
FIG. 3 is a rear view of the turning machine shown in FIG. 1.

The X-axis direction slide 50, as shown in FIGS. 2 and 3, is formed to have a vacant area 50H where the workpiece grasped by the main spindle 20 can pass through. The forming position of vacant area 50H in a XY plane is substantially coincident with that of the vacant area 40H of the Y-axis direction slide 50. The X-axis direction slide 50, as shown in FIG. 1 or FIG. 3, the end portion thereof is connected with a X-axis motor 53.

Owing to the arrangement described above, the X-axis direction slide 50 is driven in the X-axis direction along the guides 51 and 52 by receiving power from the X-axis motor 53.

By such an arrangement described so far, the tool holding mechanism 30 is movable in the direction of X-axis and Y-axis. Accordingly, tools 421, 422, and 423 are also movable in the same direction.

The guide bush 90, as shown in FIG. 2. is disposed so as to pass through the vacant area 50 H formed in the X-axis direction slide 50 and the vacant area 40H formed in the Y-axis direction slide 40. The guide bush 90 supports slidably the workpiece which is protruded from the main spindle 20. Owing to this, during cutting operation by tool, mechanical deformation such as flexion generated on a workpiece due to cutting resistance is avoided.

The guide bush 90 is supported by a first guide bush supporting unit 90A and the second guide bush supporting unit 90B. The first guide bush supporting unit 90A, as shown in FIG. 2, constitutes a part of the bed 10. The second guide bush supporting unit 90B has a side view of a substantially L-like shape. One plate-like portion which constitutes a part of the L-like shape is disposed on the guide bush supporting unit 90A and is secured by bolts 91.

The other plate-like portion constituting the L-like shape is formed with a vacant area 90BH. The vacant area 90BH is formed to have a substantially same shape as that of the end portion of the main spindle frame 21.

Owing to the presence of the vacant area 90BH, the second guide bush supporting unit 90B never disturbs a movement of the main spindle frame 21 along the Z-axis direction. In addition, the workpiece grasped by the main spindle 20 can be allowed to pass through the vacant area 90BH and vacant areas of the X-axis direction slide 50 and the Y-axis direction slide 40.

The guide bush 90 is arranged to be engaged in the vacant area 90BH of the second guide bush supporting unit 90B and secured against the second guide bush supporting unit 90B.

Owing to the arrangement as described above, the guide bush 90 comes to be immobile against the bed 10.

The controller 100 is provided with a processor, which is not shown, a ROM (Read Only Memory) which stores a program to define the procedure of the processor process, and a RAM (Random Access Memory) which stores a program executed through the reception of suitable numerical input by a user and the like as well as necessary information. The controller 100 controls and drives the Z-axis motor 22 for the main spindle 20, a workpiece rotating motor, the X-axis motor 53 for the tool holding mechanism 30, and the Y-axis motor 44. Owing to this, the relative positional correlation between the workpiece and the tools 421, 422, and 423 can be appropriately set up.

It should be noted that the controller 100 also executes controlling with regard to a displacement sensor 200, which will be described later, in addition to the above.

The displacement sensor 200, as shown in FIG. 2 and FIG. 3, is installed via a stay 202 which is secured to the lower end of the Y-axis direction slide 40 in the drawing with bolts 203, 203. The displacement sensor 200 faces to one point on the side surface of the guide bush 90 (the bottom surface in FIG. 2 and FIG. 3).

This displacement sensor 200 is, for example, an eddy currents distance measuring instrument to measure a distance between the displacement sensor 200 and the guide bush 90 controlled by the controller 100. The displacement sensor 200 is provided with a coil (not shown) in which a high frequency current flows. When a high frequency current flows in this coil, a high frequency magnetic field is generated, and thus eddy current is generated on the surface of the guide bush 90 by the action of electromagnetic induction. Thereby impedance of the coil is changed and the state of oscillation thereof is changed. The degree of the change varies in accordance with the distance between the coil and the guide bush 90. This displacement sensor 200 measures the distance based on such principle. This measured value is sent to the controller 100.

It should be noted at what sort of timing the distance measurement by the displacement sensor 200 is performed is determined by the controller 100. Moreover, any type may be selected from various known sensors as the displacement sensor 200.

An air blower 201 is provided adjacent to this displacement sensor 200. The air blower 201 is used for blowing away coolant, dust or foreign matter such as cutting chips produced by machining workpieces. Owing to this, an accurate operation of the displacement sensor 200 can be secured.

The displacement sensor 200 is fixed to the Y-axis direction slide 40 via the stay 202, and thus it is immobile against the Y-axis direction slide 40. The guide bush 90 is also immobile against the bed 10. Therefore, time-varying measurement results by the displacement sensor 200 represent temporal variation of the position of the Y-axis direction slide 40 against the bed 10 or the guide bush 90, in other words, temporal variation of relative positional correlation of the tool 421, 422, and 423 against the workpiece.

Hereinafter, "displacement amount" is going to be used as a term indicating a difference between a measured value at a certain point and a measured value at the subsequent point, or an overall point-basis difference like this in a direction of time advance.

Next, the operation of the turning machine 60 which has the above-mentioned structure will be described. Note that, in the following description, measurement of the displacement amount described above, movement of the tool holding unit 30 based on this measurement result, and the like are carried out automatically by a program stored in the RAM of the controller 100, unless otherwise specified.

Figure 4:
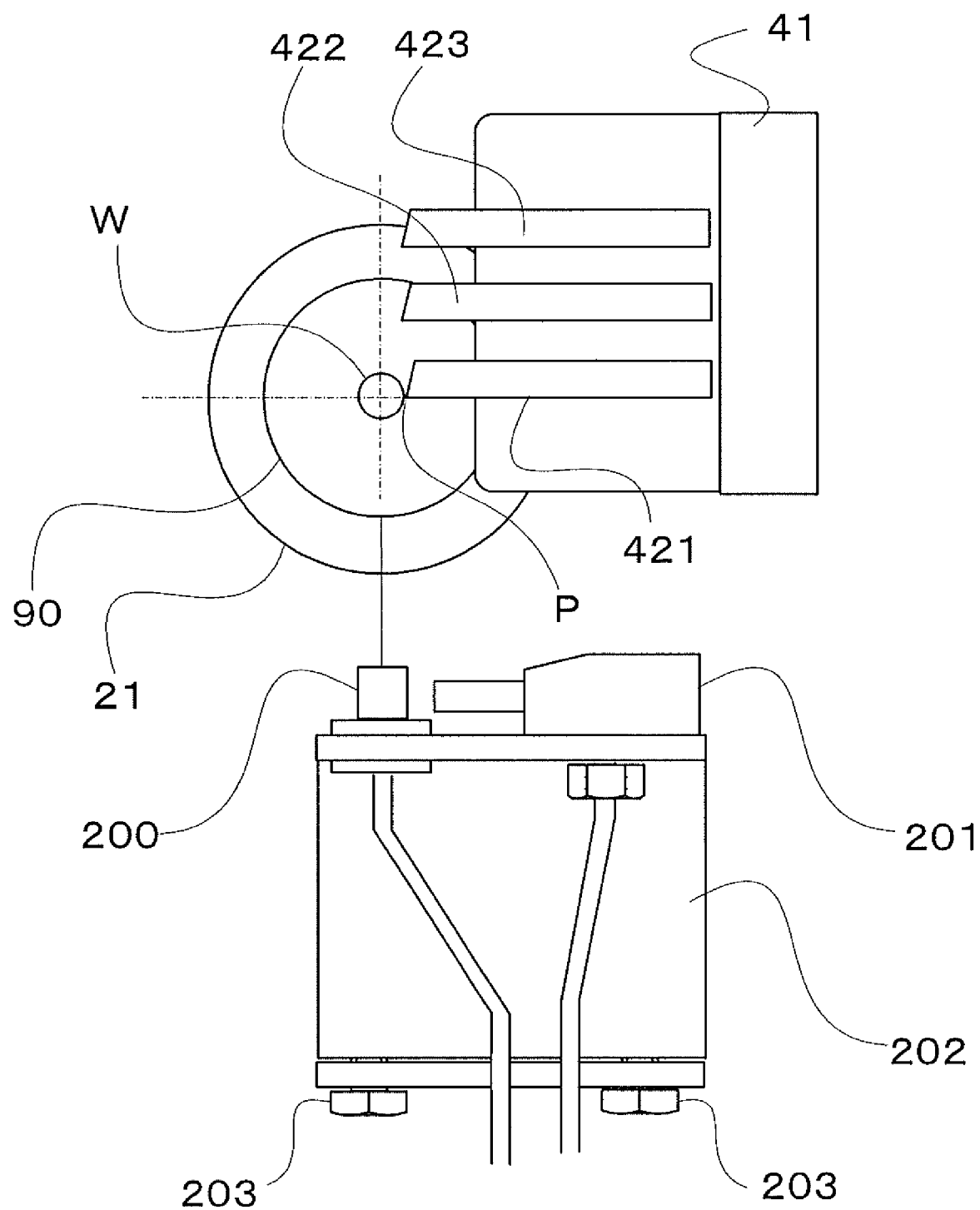
FIG. 4 illustrates an example of machining a workpiece by a tool.

FIG. 4 shows an example of external diameter machining of a workpiece W. The chuck 23 is arranged to grasp the workpiece W, and the main spindle 20 is moved along the Z-axis through energizing the Z-axis motor 22. By this action, a portion to be machined of the workpiece is positioned at the front of the tool 421, as shown in FIG. 4, for example. The Z-axis motor 22 and the X-axis motor 53 are energized and controlled, while workpiece rotating motor is energized to rotate the workpiece W. Following this, the tool 421 comes to contact the workpiece W and the external diameter is machined. This machining operation can make it possible for the external diameter of the workpiece to have desired shapes such as straight line, taper, circular, and the like.

In this occasion, regarding the relationship of the center height of the tool 421 and the workpiece W, it is preferable to keep maintaining a state of the center height of the tool 421 and the center line of the workpiece W being positioned to be in an identical horizontal plane, or a state of being in predetermined relative positional correlation, although not on an identical horizontal plane. However, cutting edge P of the tool 421 (refer to FIG. 4) is displaced due to heat generation in the driving mechanism such as the Y-axis direction slide 40, the ball screw 43, and the like or heat generation in the Y-axis motor 44, depending on the progress of machining. Therefore it is very difficult to keep maintaining the state described above.

Therefore, the present embodiment causes the turning machine 60 to operate, for example, as follows.

Figure 5:
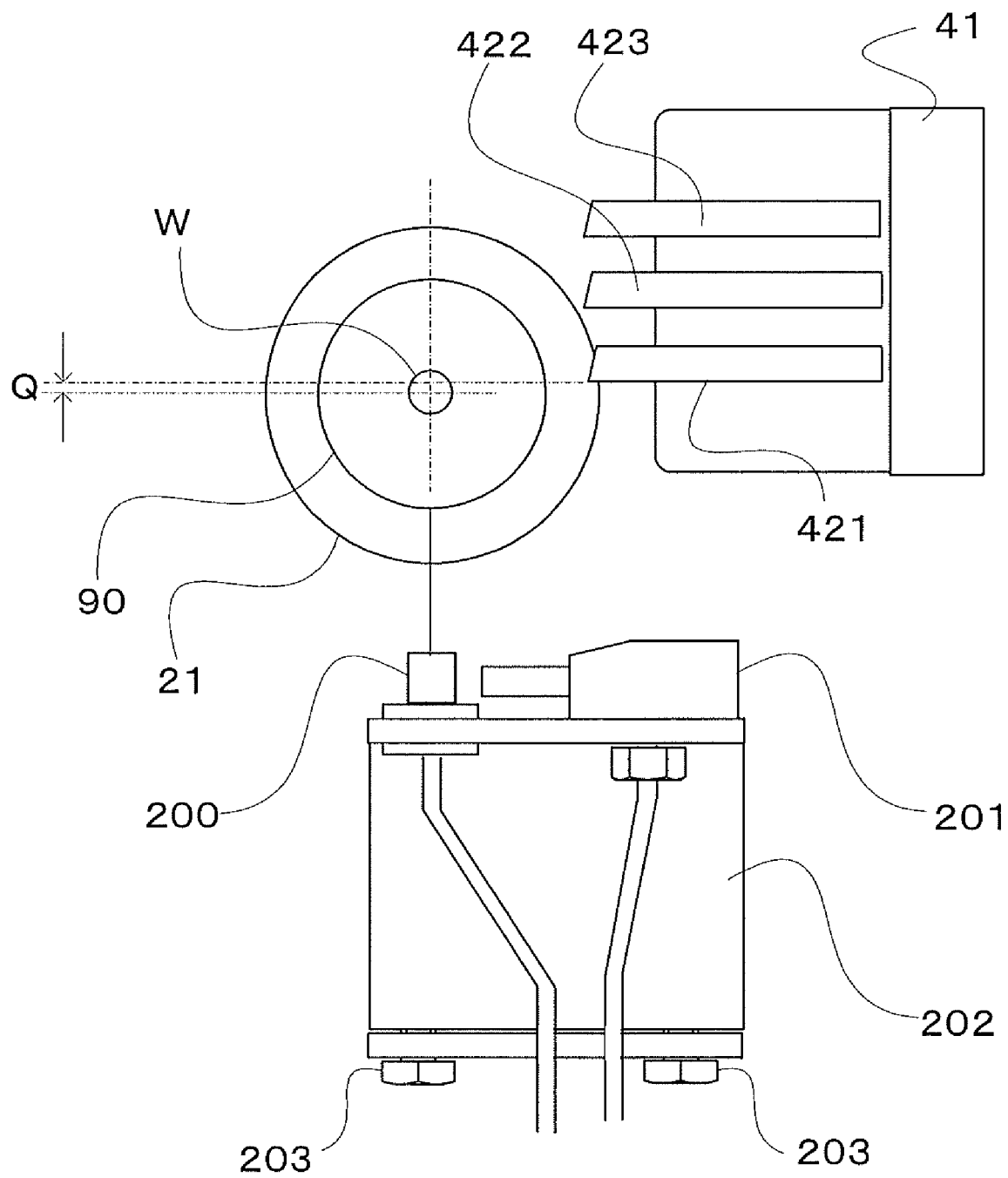
FIG. 5 illustrates an example of offset amount setting regarding tool center height.

First, the center height of the tool 421 is aligned to the center line of the workpiece W through manual operation of the Y-axis motor 44 and the like before machining starts (hereinafter it refers to 'tool center height alignment operation'). Here, tool center height alignment operation refers to create a state where the center height of the tool 421 and the center line of the workpiece W are put on an identical horizontal plane, or a state where a certain amount of offset from the above mentioned state is set up. A state where an offset was setup is shown in FIG. 5. In FIG. 5, there exists an offset Q in the vertical direction as shown in the figure between a horizontal plane including the tool 421 and a horizontal plane including the center line of the workpiece.

Second, after the completion of the tool center height alignment operation, the controller 100 drives the displacement sensor 200 to measure the distance between the displacement sensor 200 and the guide bush 90. The measured results obtained here, as to be clarified in the following description, work as a so-called standard value and are stored in the RAM of the controller 100.

Third, through driving the Z-axis motor 22 and the X-axis motor 53, an actual machining using the tool 421 is performed. As described earlier, the relative positional correlation between the tool 421 and the workpiece W gradually varies due to heat effect. Consequently, the position of the cutting edge P shown in FIG. 4 deviates as time advances.

Fourth, when machining operation for one workpiece W is completed, the controller 100 drives the displacement sensor 200. And the distance between the displacement sensor 200 and the guide bush 90 is measured again. The measured value obtained in this manner (hereinafter referred to 'the first measured value') is generally different from the standard value mentioned above. Consequently the displacement value $\delta(1)$ is obtained as $\delta(1)$=(the first measured value)−(the standard value). The attached numeral '1' in brackets denotes a displacement for the first measured value.

Figure 6:
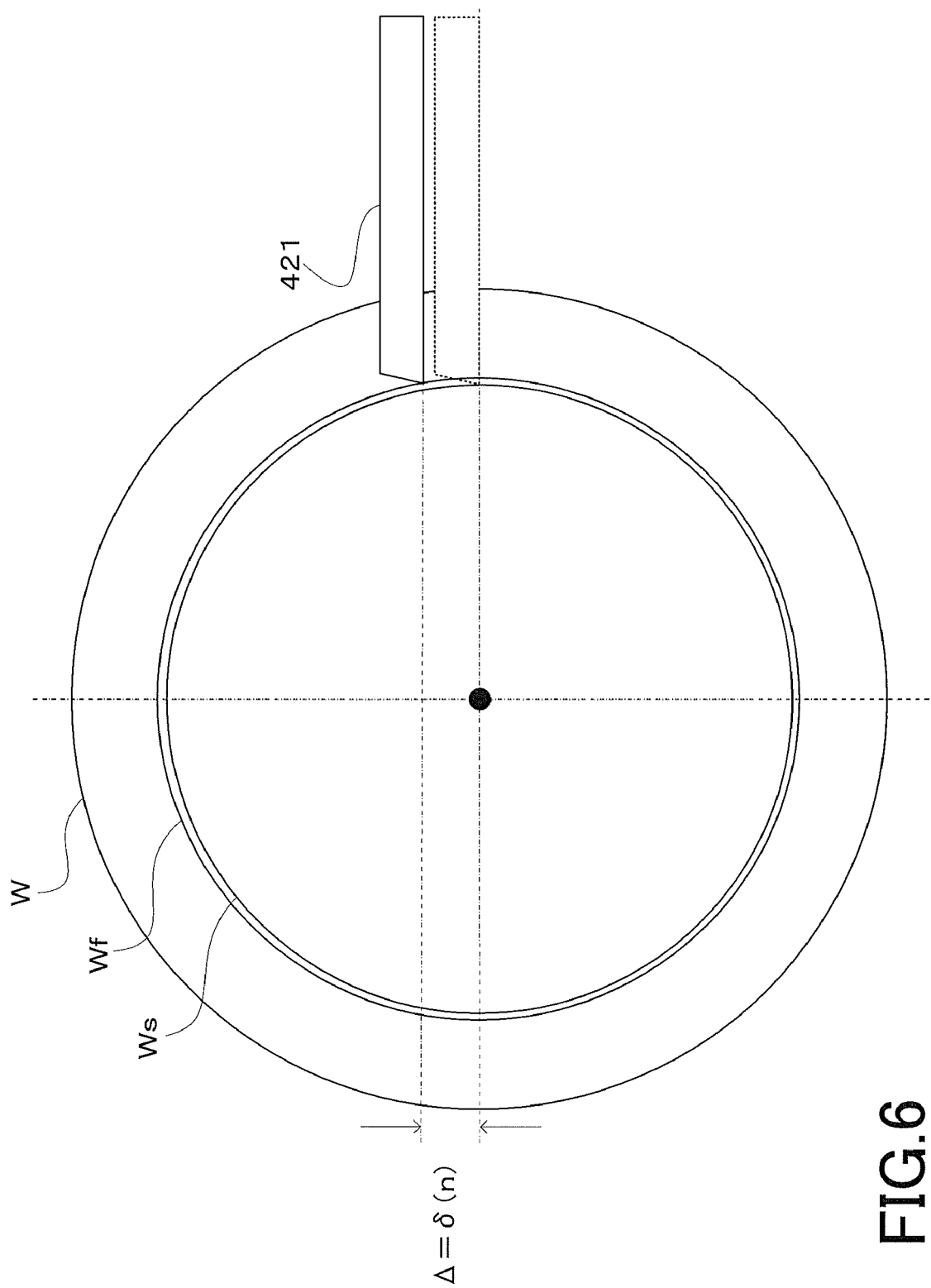
FIG. 6 is a schematic diagram regarding a displacement amount δ.

FIG. 6 is a schematic diagram regarding the displacement amount $\delta$. Even though the center height of the tool 421 and the center line of the workpiece W are positioned on an identical horizontal plane at the beginning of machining, the position of the tool 421 deviates as machining proceeds and finally, a deviation amount (hereinafter referred to 'center height deviation amount') $\Delta$ is generated (note that symbol Ws stands for a workpiece after desired machining, supposing that there is no deviation of the tool center height of the tool 421, and Wf shows a workpiece after machining when a center height deviation amount $\Delta$ is generated). This center height deviation amount $\Delta$ is substantially coincident with the displacement amount $\delta(n)$ (note that n is a positive integer). This is because the displacement sensor 200 is fixed to the Y-axis direction slide 40 securely and the tool 421 is also fixed to the Y-axis direction slide 40 securely. This is also because, even if the displacement sensor 200 or the Y-axis direction slide 40 is deformed by heat or mechanical force, the effect is negligible relative to the center height deviation amount $\Delta$.

When the displacement amount $\delta(1)$ is clarified, fifthly, the controller 100 drives the tool holding mechanism 30 or the tool 421 in the direction of the Y-axis based on the displacement amount $\delta(1)$. To be simplified mostly, the tool 421 has only to be moved by the amount to cancel the displacement amount $\delta(1)$ (namely, by the amount of $-\delta(1)$) (taking the case of FIG. 6, the tool 421 is moved downwardly in the figure). Accordingly, the center height deviation amount $\Delta$ due to machining of one workpiece W is corrected adequately.

It should be noted that when an offset value Q is set up as shown in FIG. 5 at the beginning of machining, it is recommended that the tool 421 is moved so that the offset value Q is maintained after the correction of the center height deviation amount $\Delta$.

Similar operation is carried out for the second and subsequent workpieces W. After the completion of machining for the second workpiece W, the displacement sensor 200 is driven again to measure the distance between the displacement sensor 200 and the guide bush 90 or to measure the second measured value. Based on the obtained second measured value, the displacement amount $\delta(2)$ is obtained from $\delta(2)$=(second measured value)−(standard value), and the center height of the tool 421 is aligned. Afterward, the same is true for $\delta(3)$, $\delta(4)$, - - - , and $\delta(n)$.

As described so far, the turning machine 60 according to the present invention performs correction of the center height deviation amount with regard to the tool 421 based on measurement result of the distance determining the relative positional correlation between the center height of the tool 421 and the center line of the workpiece W. Therefore, accurate and precise machining of the workpiece W can be performed.

Moreover, according to the present embodiment since correction of the center height deviation amount with regards to the tool 421 is performed in a machining process flow, so-called cutting remainder of the workpiece W becomes smaller. When a workpiece W has a cutting remainder, machining operation is required to be carried out repeatedly while the position of the tool 421 is being adjusted. Therefore, according to the present embodiment, there is little fear of disadvantage in the number of processes.

In addition, accurate and precise machining can be performed by adequately introducing the correction of the center height deviation in a machining process flow. Especially, when a workpiece with a small diameter is to be machined, the turning machine according to the present embodiment produces more remarkable effects. This is because when a workpiece has a small diameter, the amount of machining itself becomes smaller and therefore small amount of the center deviation exerts a big influence on accurate and precise machining.

It should be noted that various modifications can be implemented, notwithstanding the above embodiment. Examples of such variations include the followings, for example.

(1) In the above embodiment, every time when each individual workpiece machining is completed, the displacement amount is measured, but the present invention is not limited to such a configuration. For example, it may be configured such that every time machining of several workpieces is completed, the displacement amount is measured. Alternatively, it may be configured such that the displacement amount is measured in the middle of machining of a single workpiece.

The more measurement opportunities there is, the more number of displacement amounts $\delta$ can be measured, and the correction of the center height deviation amount $\Delta$ can be performed more adequately. However, it takes a certain amount of time to carry out a measurement. In addition, sometimes it is not critical to be sensitive about the center height deviation depending on various circumstances such as the size of the workpiece, kinds of machining, and the like. In such a case, interval of measurement can be extended so as to shorten the operation time.

(2) In the above embodiment, description is given under a supposition that the center height deviation amount $\Delta$, which was described referring to FIG. 6 and the displacement amount $\delta(n)$, which was obtained from the measurement result by the displacement sensor 200 are substantially equal. However, if an extremely strict viewpoint that heat displacement and the like of the displacement sensor 200 itself or Y-axis direction slide 40 itself are added is taken, $\Delta$ and $\delta(n)$ are not always equal. Even in such a case, heat displacement of the displacement sensor 200 itself or Y-axis direction slide 40 itself, and the like can sometimes be estimated to be a standard feature theoretically, experimentally or through the accumulation of experience. If such estimated displacement amount is known, the center height deviation amount Δ which is closer to the true value can be obtained through suitable processing of the measured displacement amount δ(n) (for example, addition or subtraction) using the estimated displacement amount.

(3) In the above embodiment, the reference point is set on a point of the side surface on the guide bush 90 and a variable point is set on the displacement sensor 200 itself, which merely shows an embodiment of the present invention. The variable point can work if the displacement of the position of tool 421 is reflected, and an adequate measuring point, if any, may be selected. For example, the measurement that a position of the tool 421 is taken as one of edge points may be performed. Note that the term 'reflect' includes a case where the variable point varies with the same displacement amount as the displacement amount of the position of the tool 421 (hereinafter referred to 'a base displacement amount'), a case where the variable point varies with the displacement amount of being in proportion to or in inverse proportion to the base displacement amount, and a case where the variable point varies with the displacement amount performed by a predetermined arithmetic process on the base displacement amount.

(4) In the above, a case where the center height of the tool 421 and the center line of the workpiece W are positioned on an identical horizontal plane are described predominantly, and a fact that an offset value Q may be set up is referred. Method of setting up this offset value Q may include various manners. For example, such an arrangement may be adopted that different offset amounts Q1, Q2, - - - , Qm (m is a positive integer) are set up every time each correction of the center height deviation amount Δ is performed. In this case, all of or a part of Q1, Q2, - - - , and Qm may be '0'.

(5) In the above mentioned embodiments, the description was given exclusively taking the tool 421 for example, but the similar processes can be performed for other tools 422, and 423 as well. In addition, for example, tools such as drills which are disposed along the center line of the workpiece and face to the end surface of the workpiece can be mounted on the Y-axis direction slide 40.

(6) In the above embodiments, X-axis direction, Y-axis direction, and Z-axis direction are to be perpendicular with each other, but they need not to be perpendicular if each direction is different.

This application is based on JP 2006-291052 filed on the 26 Oct. 2006. Of which specification, claims and drawings in its entirety are incorporated herein by reference.

INDUSTRIAL APPLICABILITY

The present invention can be utilized in a turning machine for accurate and precise machining of a workpiece.

The invention claimed is:

1. A turning machine comprising:
a main spindle including a chuck which grasps a workpiece;
a tool-holding unit on which tools are mounted for machining the workpiece;
a guide bush which supports slidably the workpiece;
a measuring device which measures a distance between an immobile reference point which is immobile in a first direction, perpendicular to an axial direction of the workpiece and a variable point in which varies so as to be linked to the tools that is displaced with a progress of machining of the workpiece; and
a tool-holding unit driving device which moves the tool-holding unit together with the tools in the first direction based on measured distance by the measuring device between the reference point and the variable point so that center height of the tool and a center line of the workpiece satisfy predetermined positional correlation;
wherein the reference point is set on the external surface of the guide bush, facing the variable point in the first direction, and the measuring device is fixed to the tool-holding unit at a position facing to the reference point, and the variable point is set on the measuring device, while the measuring device measures a distance along the first direction between itself and the reference point.

2. The turning machine according to claim 1, wherein the measuring device measures the distance every time machining of a predetermined workpiece is completed, and the tool holding unit-driving device moves the tool every time the distance is measured.

3. The turning machine according to claim 1, wherein the tool-holding unit driving device moves the tool so that the center height of the tool and the center line of the workpiece are positioned on an identical plane.

4. The turning machine according to claim 1, further comprising an air blower for blowing away foreign matter stuck on the measuring device therefrom.

5. A machining method by the turning machine comprising steps of:
a distance measuring process by a measuring device to measure a distance between a reference point which is immobile against a workpiece in a first direction, perpendicular to an axial direction of the workpiece, and a variable point which varies so as to be linked with a tools which is displaced with a progress of machining of the workpiece; and
tool moving process to move the tools in the first direction based on the measured distance between the reference point and the variable point so that a center height of the tool and a center line of the workpiece satisfy a predetermined positional correlation,
wherein the reference point is set on the external surface of a guide bush which supports slidably the workpiece, facing the variable point in the first direction,
the measuring device is fixed to a tool-holding unit on which the tools are mounted, at a position facing to the reference point, the variable point is set up on the measuring device, and the measuring device measures a distance along the first direction between the measuring device itself and the reference point.

6. The machining method by the turning machine according to claim 5, wherein the measuring device measures the distance every time machining of a predetermined workpiece is completed, and the tool holding unit-driving devices move the tool every time the distance is measured.

7. The turning machine according to claim 1, further comprising:
a guide bush-supporting unit supporting the guide bush;
a first slider which engages with the guide bush-supporting unit and is movable with regard to the guide bush-supporting unit in a second direction which is perpendicular to the first direction and to the axial direction of the workpiece; and
a second slider which engages with the first slider and is movable with regard to the first slider in the first direction;
wherein the tool-holding unit is attached to the second slider.

* * * * *